United States Patent
Yano et al.

(10) Patent No.: US 12,174,095 B2
(45) Date of Patent: Dec. 24, 2024

(54) DEVICE FOR INSPECTING WEDGE LOOSENESS OF ROTARY ELECTRIC MACHINE, SYSTEM FOR INSPECTING WEDGE LOOSENESS OF ROTARY ELECTRIC MACHINE, AND METHOD FOR INSPECTING WEDGE LOOSENESS OF ROTARY ELECTRIC MACHINE

(71) Applicant: Mitsubishi Generator Co., Ltd., Kobe (JP)

(72) Inventors: Kota Yano, Tokyo (JP); Koji Yonekura, Tokyo (JP); Naoya Kadota, Tokyo (JP); Dinh Duyanh, Tokyo (JP)

(73) Assignee: Mitsubishi Generator Co., Ltd, Kobe (JP)

( * ) Notice: Subject to any disclaimer, the term of this patent is extended or adjusted under 35 U.S.C. 154(b) by 354 days.

(21) Appl. No.: 17/596,221

(22) PCT Filed: Jun. 14, 2019

(86) PCT No.: PCT/JP2019/023703
§ 371 (c)(1),
(2) Date: Dec. 6, 2021

(87) PCT Pub. No.: WO2020/250431
PCT Pub. Date: Dec. 17, 2020

(65) Prior Publication Data
US 2022/0326121 A1  Oct. 13, 2022

(51) Int. Cl.
*G01M 99/00* (2011.01)
*G01N 29/04* (2006.01)
(Continued)

(52) U.S. Cl.
CPC ......... *G01M 99/005* (2013.01); *G01N 29/045* (2013.01); *G01N 29/265* (2013.01); *G01N 29/46* (2013.01)

(58) Field of Classification Search
CPC ... G01M 99/005; G01N 29/46; G01N 29/265; G01N 29/226; G01N 29/045;
(Continued)

(56) References Cited

U.S. PATENT DOCUMENTS

| | | | |
|---|---|---|---|
| 4,962,660 A * | 10/1990 | Dailey | G01R 31/34 73/12.09 |
| 10,605,782 B2 | 3/2020 | Morimoto et al. | |

(Continued)

FOREIGN PATENT DOCUMENTS

| | | |
|---|---|---|
| EP | 0403835 A2 | 12/1990 |
| JP | H0447245 A | 2/1992 |

(Continued)

OTHER PUBLICATIONS

Extended European Search Report dated Apr. 4, 2022, issued in corresponding European Patent Application No. 19932915.2, 8 pages.

(Continued)

*Primary Examiner* — Jennifer Bahls
*Assistant Examiner* — Quang X Nguyen
(74) *Attorney, Agent, or Firm* — BUCHANAN, INGERSOLL & ROONEY PC (57) ABSTRACT

This wedge looseness inspector for a rotary electric machine includes: an inspector including a wedge striker having a tap hammer for striking a wedge, and a wedge vibration detector for detecting vibration of the wedge; and attraction portions connected to the inspector via connection members and being attractable to an outer circumferential surface of a stepped-down portion, wherein the attraction portions have, on an inner side in the axial direction, first attachments that allow adjustment of the attached position in the axial direction of the attraction portions or replacement thereof.

12 Claims, 9 Drawing Sheets

(51) Int. Cl.
    *G01N 29/265*     (2006.01)
    *G01N 29/46*     (2006.01)

(58) Field of Classification Search
    CPC ... G01N 2291/2697; G01N 2291/2693; H02K 15/0018; H02K 15/063
    See application file for complete search history.

(56) References Cited

U.S. PATENT DOCUMENTS

2009/0194346 A1*   8/2009   Moore ............... H02K 15/0018
                                                        348/148
2019/0368968 A1    12/2019   Morimoto et al.

FOREIGN PATENT DOCUMENTS

| JP | 6250241 B1 | 12/2017 |
|----|-----------|---------|
| JP | 6333492 B1 | 5/2018 |
| JP | 6370509 B2 | 8/2018 |
| KR | 20130005156 A | 1/2013 |
| WO | 2018134992 A1 | 7/2018 |

OTHER PUBLICATIONS

International Search Report (PCT/ISA/210) with English translation and Written Opinion (PCT/ISA/237) mailed on Sep. 3, 2019, by the Japan Patent Office as the International Searching Authority for International Application No. PCT/JP2019/023703.

* cited by examiner

DEVICE FOR INSPECTING WEDGE LOOSENESS OF ROTARY ELECTRIC MACHINE, SYSTEM FOR INSPECTING WEDGE LOOSENESS OF ROTARY ELECTRIC MACHINE, AND METHOD FOR INSPECTING WEDGE LOOSENESS OF ROTARY ELECTRIC MACHINE

TECHNICAL FIELD

The present disclosure relates to a wedge looseness inspection device for a rotary electric machine, a wedge looseness inspection system for a rotary electric machine, and a wedge looseness inspection method for a rotary electric machine.

BACKGROUND ART

A rotary electric machine is composed of a rotor and a stator, and converts change in a magnetic field generated through rotation of the rotor to electric energy by the stator. The stator has a structure in which coils are inserted in slots of a core formed by stacking silicon steel sheets and the coils are pressed and fixed by insulating components. As a method for pressing and fixing the coil, a wavy ripple spring and a wedge which is a plate-shaped member are overlaid on the radially outer side of the coil and the coil is fixed by being pressed by the wedge with the ripple spring compressed.

In the rotary electric machine having such a structure, it is necessary to perform maintenance and management by pressing the coils with a predetermined force so as to be fixed to the core. In the rotary electric machine having such a coil fixation structure, the fixation states of the wedges need to be regularly inspected, and if there is a loosened part, the ripple spring and the wedge need to be maintained or replaced to restore the pressing force.

In inspection for the states of the wedges of the rotary electric machine, with the rotor pulled out, an inspector strikes the wedges with a hammer, and determines whether the wedge is tightened or loosened, by the inspector's senses on the basis of sound and vibration occurring through the striking.

Meanwhile, from the standpoint of improving the operation rate of the rotary electric machine, in order to omit the work of taking off the rotor so as to shorten the downtime required for inspection, a rotary electric machine wedge striking device that can be inserted into a gap between a rotor and a stator of a rotary electric machine, and a wedge inspection system using this device, are proposed (Patent Document 1).

CITATION LIST

Patent Document

Patent Document 1: Japanese Patent No. 6250241

SUMMARY OF THE INVENTION

Problems to be Solved by the Invention

Among wedges of a rotary electric machine targeted by the present disclosure, an axial-direction end wedge is located at a so-called "stepped-down portion" of a stator core. The shape of the stator core at this portion is such a stepped shape that the inner diameter gradually increases outwardly in a stepwise form as approaching the outer side in the axial direction.

In the rotary electric machine wedge striking device described in Patent Document 1, the length of a housing thereof is smaller than the axial-direction length of each step of the stepped-down portion of the stator core. Therefore, the striking device cannot be fixed to the stepped-down portion of the stator core, thus having a problem that it is impossible to perform looseness inspection for the axial-direction end of the end wedge.

The present disclosure has been made to solve the above problem, and an object of the present disclosure is to provide a wedge looseness inspection device for a rotary electric machine, a wedge looseness inspection system for a rotary electric machine, and a wedge looseness inspection method for a rotary electric machine that can be applied to various rotary electric machines irrespective of the axial-direction length of an end wedge which differs among the types of the rotary electric machines, or difference in the relative positional relationship between the end wedge and a stepped-down portion.

Solution to the Problems

A wedge looseness inspection device for a rotary electric machine according to the present disclosure is a wedge looseness inspection device for a rotary electric machine in which, at an end in an axial direction of a stator core, a part having such a stepped shape that an inner diameter of the stator core increases stepwise toward an outer side in the axial direction is defined as a stepped-down portion, the wedge looseness inspection device being for inspecting looseness of a wedge pressing an inner circumferential surface of a conductor inserted into a slot of the stepped-down portion, toward an outer side in a radial direction so as to be fixed, the wedge looseness inspection device including: an inspection unit including a wedge striking device having a tap hammer for striking the wedge, and a wedge vibration detection device for detecting vibration of the wedge due to the striking; and an attraction portion connected to the inspection unit via a connection member and being attractable to an inner circumferential surface of the stepped-down portion, wherein the attraction portion has, on an inner side in the axial direction, a first attachment that allows adjustment of an attached position in the axial direction of the attraction portion.

A wedge looseness inspection system for a rotary electric machine according to the present disclosure includes: the wedge looseness inspection device; a frequency analysis unit for analyzing a frequency characteristic of a vibration waveform of the struck wedge; and an evaluation unit which compares and evaluates the frequency characteristic analyzed from the vibration waveform, with a predetermined determination reference, and quantifies a determination result thereof.

A wedge looseness inspection method for a rotary electric machine according to the present disclosure uses the wedge looseness inspection device for the rotary electric machine, and includes: without taking off a rotor from the rotary electric machine, inserting the wedge looseness inspection device for the rotary electric machine between the stepped-down portion and the rotor of the rotary electric machine from the outer side in the axial direction; and pressing an inner side end surface in the axial direction of the first attachment against an outer side end surface in the axial direction of the stepped-down portion having the stepped shape, so as to make positioning for a position at which the wedge is struck by the tap hammer.

Effect of the Invention

The wedge looseness inspection device for a rotary electric machine according to the present disclosure can be applied to various rotary electric machines irrespective of the length in the axial direction Z of the end wedge which differs among the types of the rotary electric machines, or difference in the relative positional relationship between the end wedge and the stepped-down portion.

The wedge looseness inspection system for a rotary electric machine according to the present disclosure can be applied to various rotary electric machines irrespective of the length in the axial direction Z of the end wedge which differs among the types of the rotary electric machines, or difference in the relative positional relationship between the end wedge and the stepped-down portion.

The wedge looseness inspection method for a rotary electric machine according to the present disclosure allows inspection for looseness of the wedge fixing the coil of the stator without taking off the rotor, whereby the inspection work can be finished within a short time.

DESCRIPTION OF EMBODIMENTS

Embodiment 1

Hereinafter, a wedge looseness inspection device for a rotary electric machine, a wedge looseness inspection system for a rotary electric machine, and a wedge looseness inspection method for a rotary electric machine according to embodiment 1 will be described with reference to the drawings.

Figure 1:
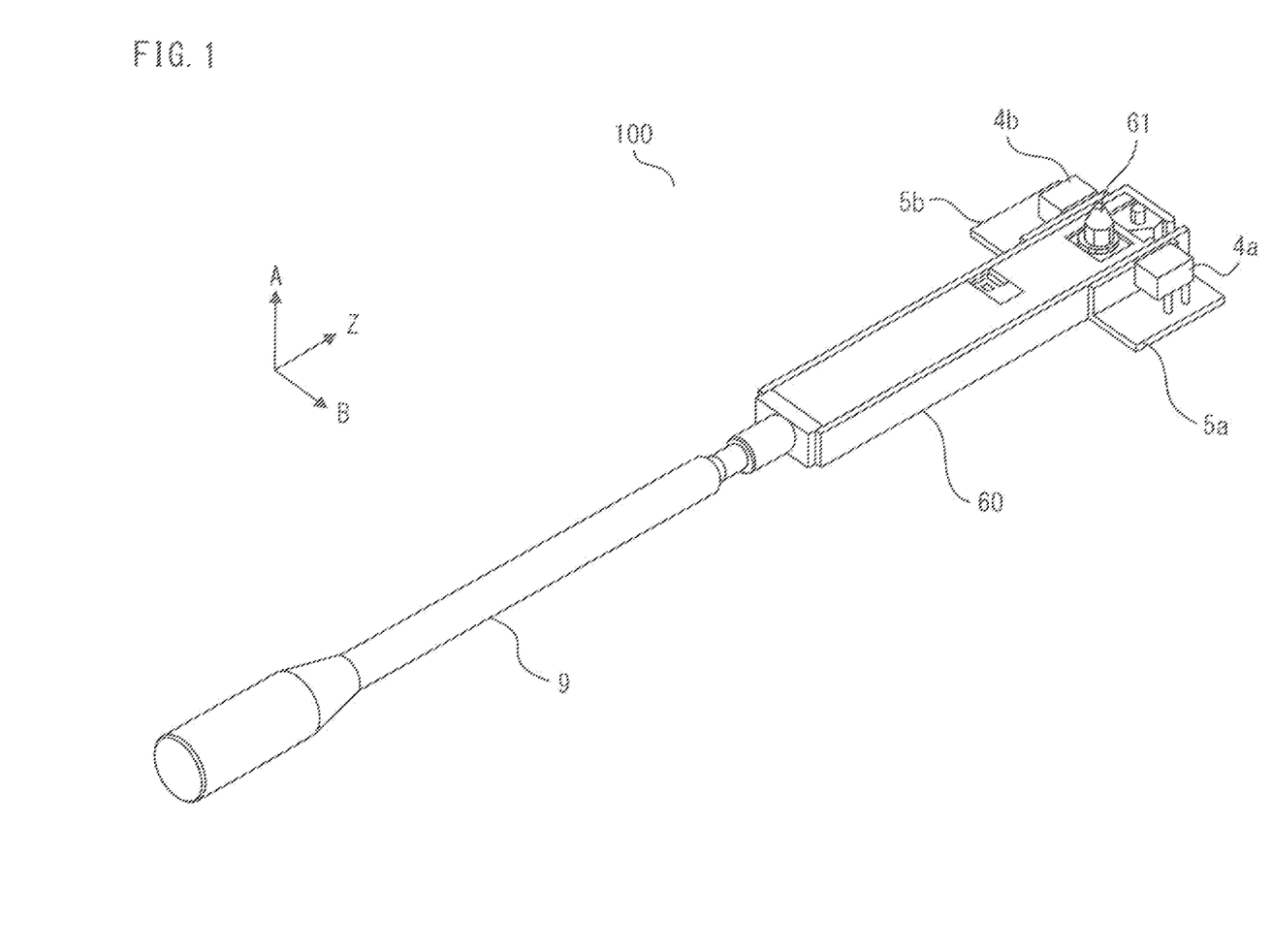
FIG. 1 is a perspective view of a wedge looseness inspection device for a rotary electric machine according to embodiment 1.

FIG. 1 is a perspective view showing a wedge looseness inspection device 100 for a rotary electric machine (hereinafter, simply referred to as device 100).

Figure 2:
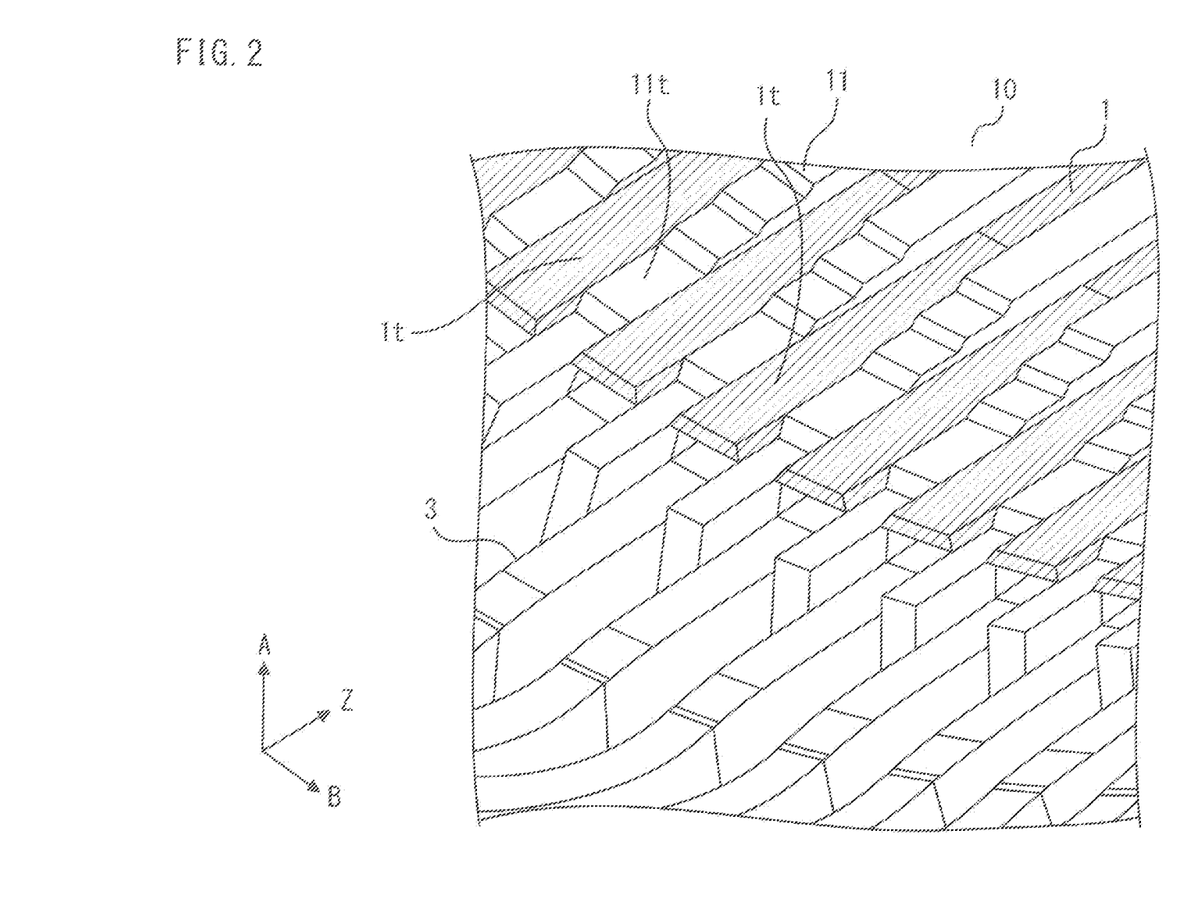
FIG. 2 is a perspective view showing the inner side of an axial-direction end of a stator of the rotary electric machine which is an inspection target in embodiment 1.

FIG. 2 is a perspective view showing the inner side of an end portion in an axial direction Z of a stator 10 of the rotary electric machine which is an inspection target. As shown in FIG. 2, conductors 3 forming coils of the stator 10 are fixed such that the inner circumferential surface of each conductor 3 is pressed toward the outer side in a radial direction A by a wedge 1 and a ripple spring (not shown) inserted between the wedge 1 and the conductor 3.

In actuality, a plurality of wedges 1 are inserted for fixing one conductor 3 inserted into one slot. Then, among the plurality of wedges 1 inserted into one slot, wedges 1 inserted at both ends in the axial direction Z are referred to as end wedges 1t. The end wedge 1t is placed with its both ends in a circumferential direction B held between stepped-down portions 11t of the stator core 11. The stepped-down portion 11t is a part having such a stepped shape that the inner diameter of the stator core 11 increases stepwise toward the outer side in the axial direction Z, at the end in the axial direction Z of the stator core 11.

As shown in FIG. 1, the device 100 includes: a first attraction portion 4a and a second attraction portion 4b which are arranged side by side in the circumferential direction B of the rotary electric machine and which are each attractable to the inner circumferential surface of the stepped-down portion 11t of the stator core 11 of the rotary electric machine; an inspection unit 60 provided between the first attraction portion 4a and the second attraction portion 4b and having a device for measuring looseness of the end wedge 1t; a first connection member 5a connecting the first attraction portion 4a and the inspection unit 60; and a second connection member 5b connecting the second attraction portion 4b and the inspection unit 60.

The inspection unit 60 has a structure that allows attachment of a manual operation handle 9 using a screw-in structure, and the handle 9 serves as a grip at the time of moving the device 100 and at the time of attachment to the stepped-down portion 11t of the stator core 11. The inspection unit 60 has a tap hammer 61 to strike at the center position in the axial direction Z on the end wedge 1t. FIG. 1 shows a state in which the tap hammer 61 of the inspection unit 60 protrudes out.

Figure 3:
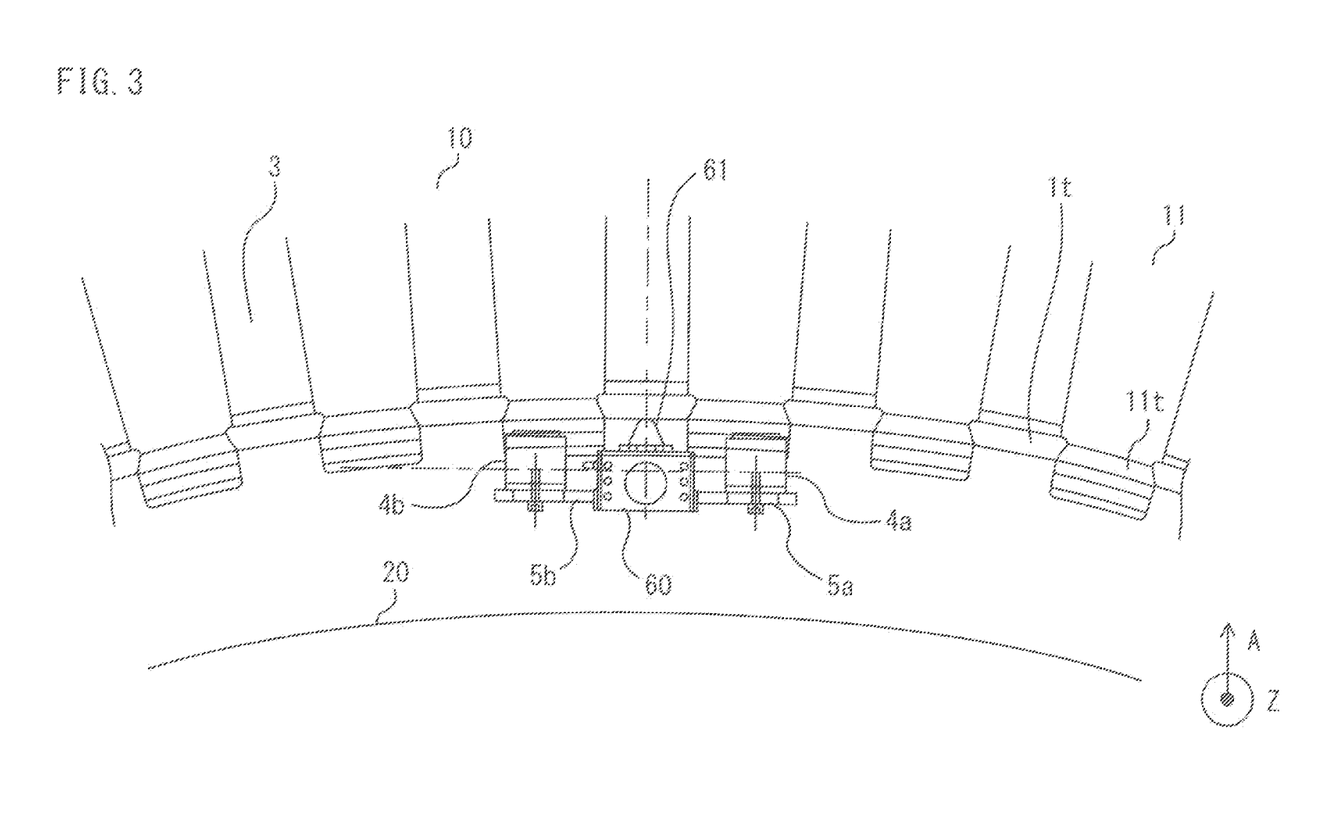
FIG. 3 is a schematic front view showing a state in which the wedge looseness inspection device for the rotary electric machine according to embodiment 1 is inserted to a stepped-down portion of a stator core of the rotary electric machine, from the outer side in the axial direction.

FIG. 3 is a schematic front view showing a state in which the device 100 is inserted to the stepped-down portion 11t of the stator core 11 of the rotary electric machine from the outer side in the axial direction Z.

Figure 4:
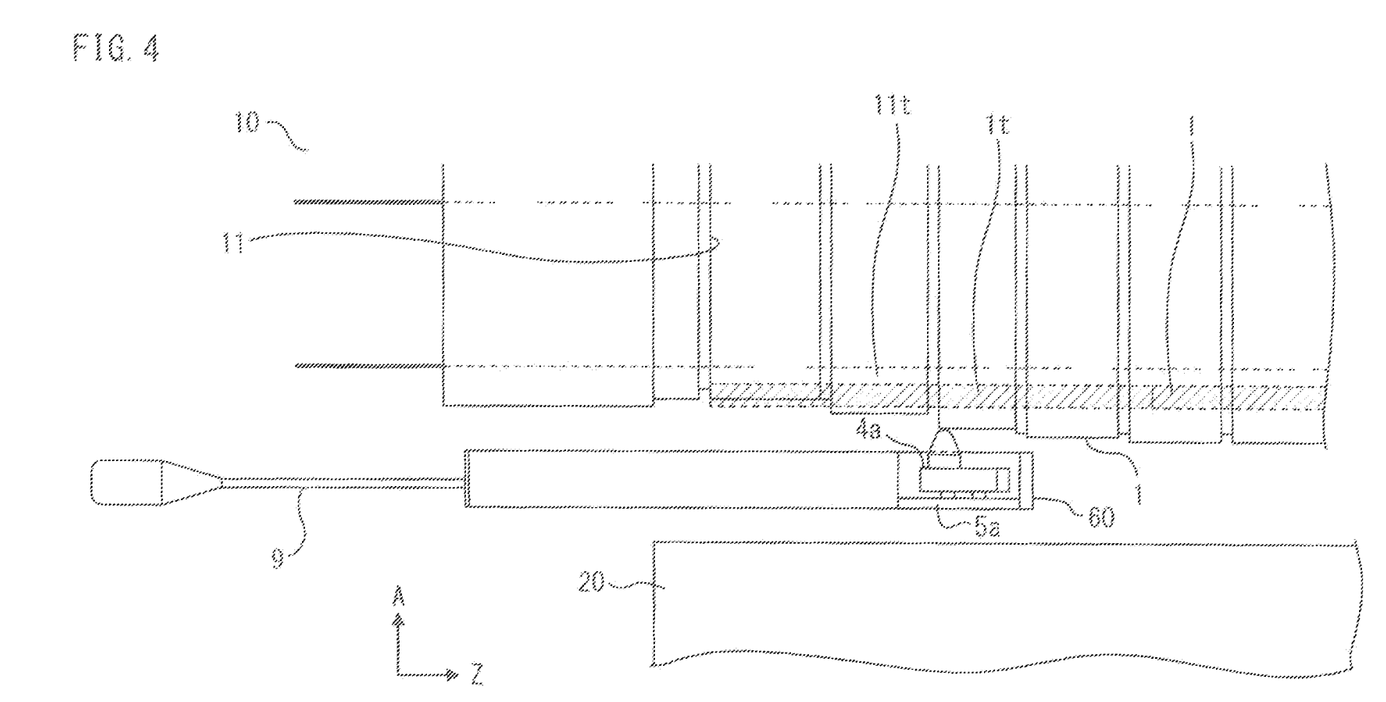
FIG. 4 is a side view as seen in the circumferential direction, showing a state in which the wedge looseness inspection device for the rotary electric machine according to embodiment 1 is inserted to the stepped-down portion of the stator core from the outer side in the axial direction and is fixed.

FIG. 4 is a side view as seen in the circumferential direction B, showing a state in which the device 100 is inserted to the stepped-down portion 11t of the stator core 11 from the outer side in the axial direction Z.

In inspection using the device 100, looseness of the end wedge 1t is inspected without taking off the rotor 20 of the rotary electric machine, and therefore, the device 100 is inserted between the stepped-down portion 11t of the stator core 11 and the rotor 20 from the outer side in the axial direction Z.

Figure 5A:
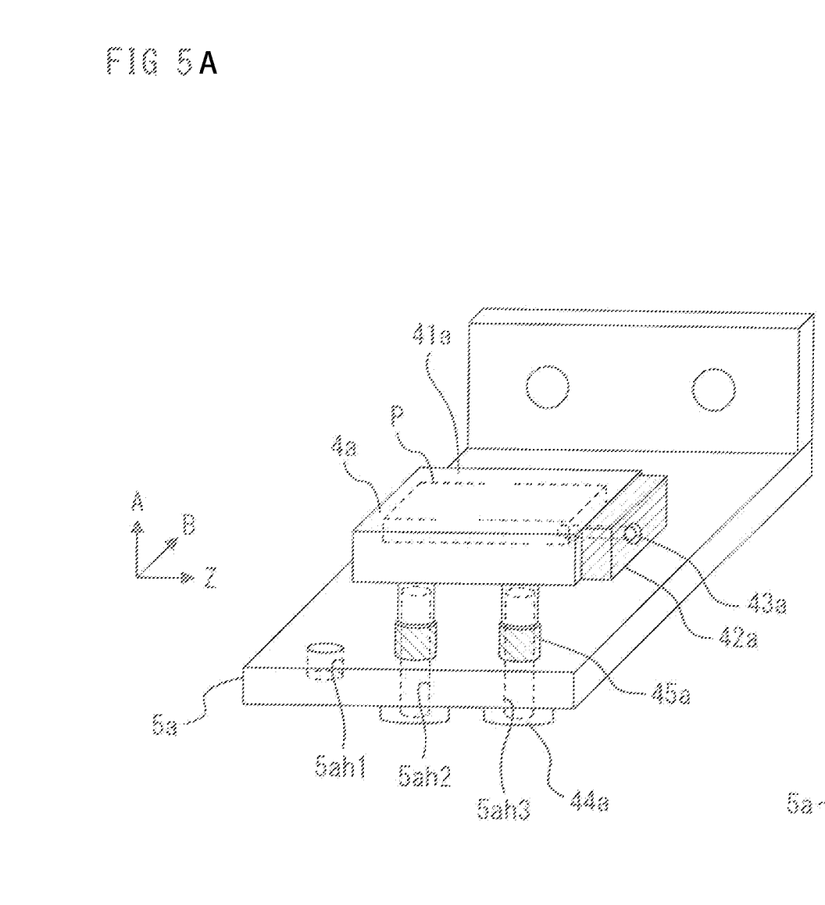
FIG. 5A is a perspective view showing the configuration of an attraction portion of the end wedge looseness measurement device according to embodiment 1.
Figure 5B:
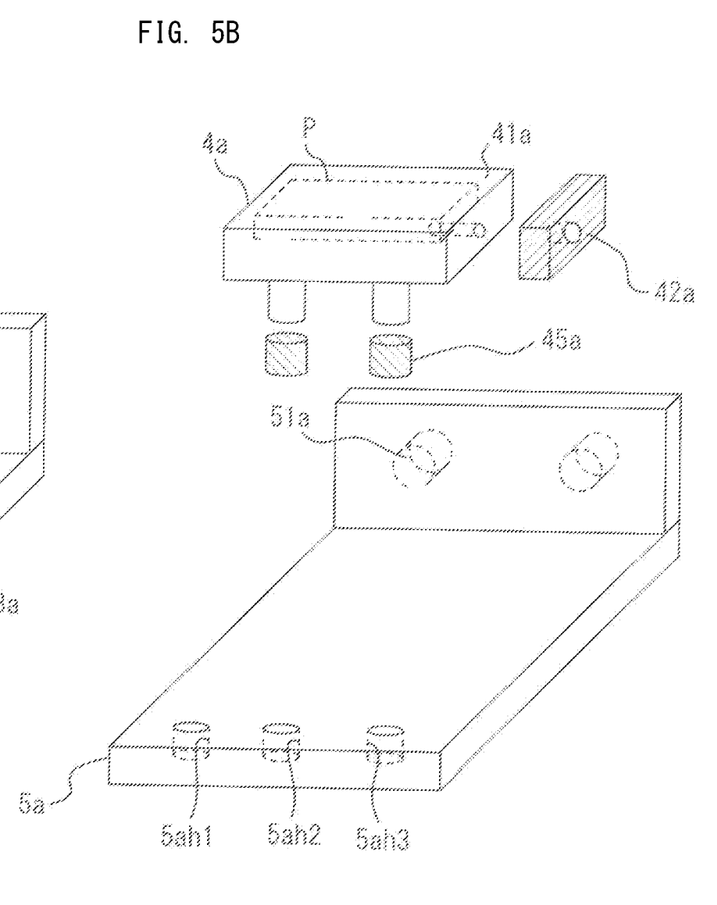
FIG. 5B is a perspective view showing the configuration of an attraction portion of the end wedge looseness measurement device according to embodiment 1.

FIG. 5A and FIG. 5B are perspective views showing the configurations of the first attraction portion 4a and the first connection member 5a of the device 100. It is noted that the second attraction portion 4b and the second connection member 5b are left-right symmetric with the first attraction portion 4a and the first connection member 5a, and have the same configurations and functions, respectively. Of the first attraction portion 4a, an attraction surface 41a (upper surface in FIG. 5) to slide on the outer circumferential surface of the stator core 11 is made of a material having a low friction coefficient. The first attraction portion 4a has a permanent magnet P therein, and thereby is attracted and fixed to the stepped-down portion 11t of the stator core 11.

Making the attraction surface 41a of a material having a low friction coefficient allows smooth movement in the axial direction Z through manual operation by gripping the handle 9 without providing a driving mechanism such as a motor, a pulley, and a gear for movement and a control mechanism relevant thereto.

The permanent magnet P may be replaced with an electromagnet. In this case, by turning ON/OFF the power for the electromagnet as appropriate, it is possible to prevent the first attraction portion 4a from being unnecessarily attracted to the stepped-down portion 11t of the stator core 11, thus facilitating attachment of the device 100 to the stator 10.

The first attraction portion 4a has, at an inner side end in the axial direction Z, an attachment 42a (first attachment) that allows adjustment of the position in the axial direction Z, in order to adjust the attracted position in the axial direction Z with respect to the stepped-down portion 11t described above, in a predetermined length range. The attachment 42a is attached to the first attraction portion 4a by an adjustment member 43a, and the attached position thereof in the axial direction Z can be finely adjusted by rotating the adjustment member 43a. Further, it is also possible to replace the attachment 42a with another one having different dimensions.

The first attraction portion 4a is connected to the first connection member 5a by fastening members 44a. Between the first attraction portion 4a and the first connection member 5a, attachments 45a (second attachments) that allow adjustment of the position in the radial direction A can be inserted or replaced, in order to adjust the position in the radial direction A of the inspection unit 60 in a predetermined length range.

In the first connection member 5a, a plurality of attachment holes 5ah1, 5ah2, 5ah3 for insertion of the fastening members 44a are formed in series in the axial direction Z, so as to allow the connection position of the first attraction portion 4a to be changed in the axial direction Z. The first connection member 5a is connected to the inspection unit 60 by fastening members 51a.

As described above, the device 100 has the tap hammer 61 to strike at the center position in the axial direction Z on the end wedge 1t. In FIG. 4, on the stepped-down portion 11t, the above position corresponds to the center position in the axial direction Z of a part where the inner diameter of the stator core 11 increases in four steps toward the outer side in the axial direction Z.

Figure 6:
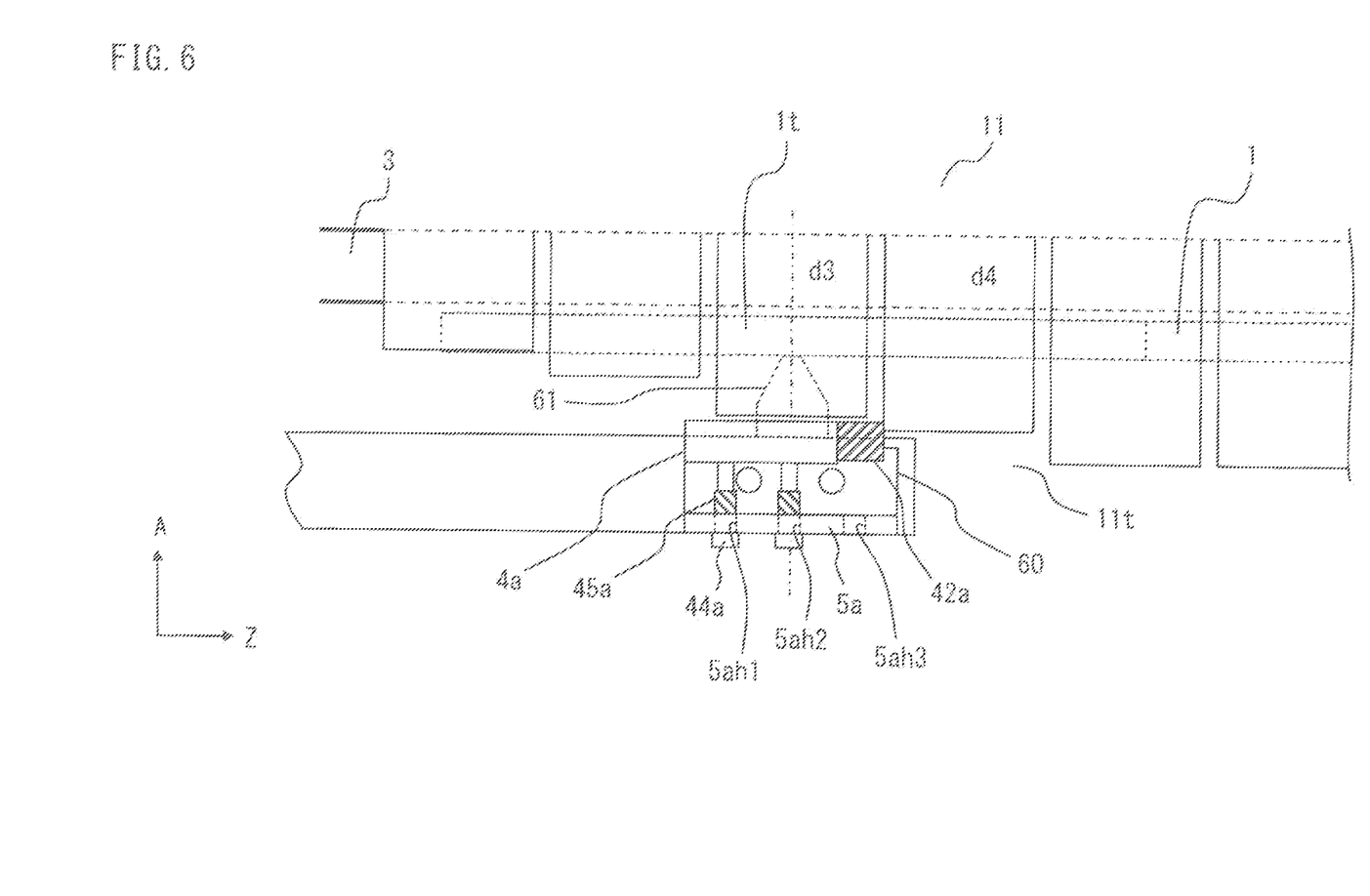
FIG. 6 shows variation of the end wedge which is an inspection target.
Figure 7:
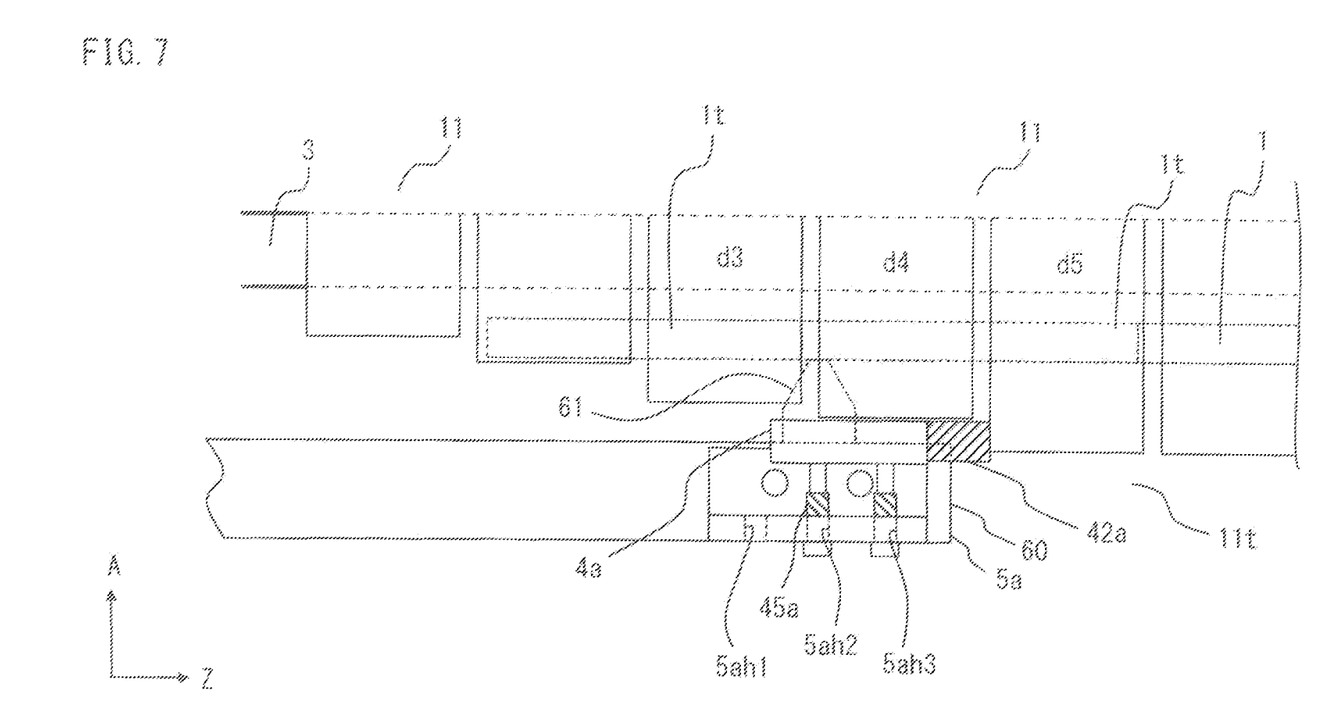
FIG. 7 shows variation of the end wedge which is an inspection target.
Figure 8:
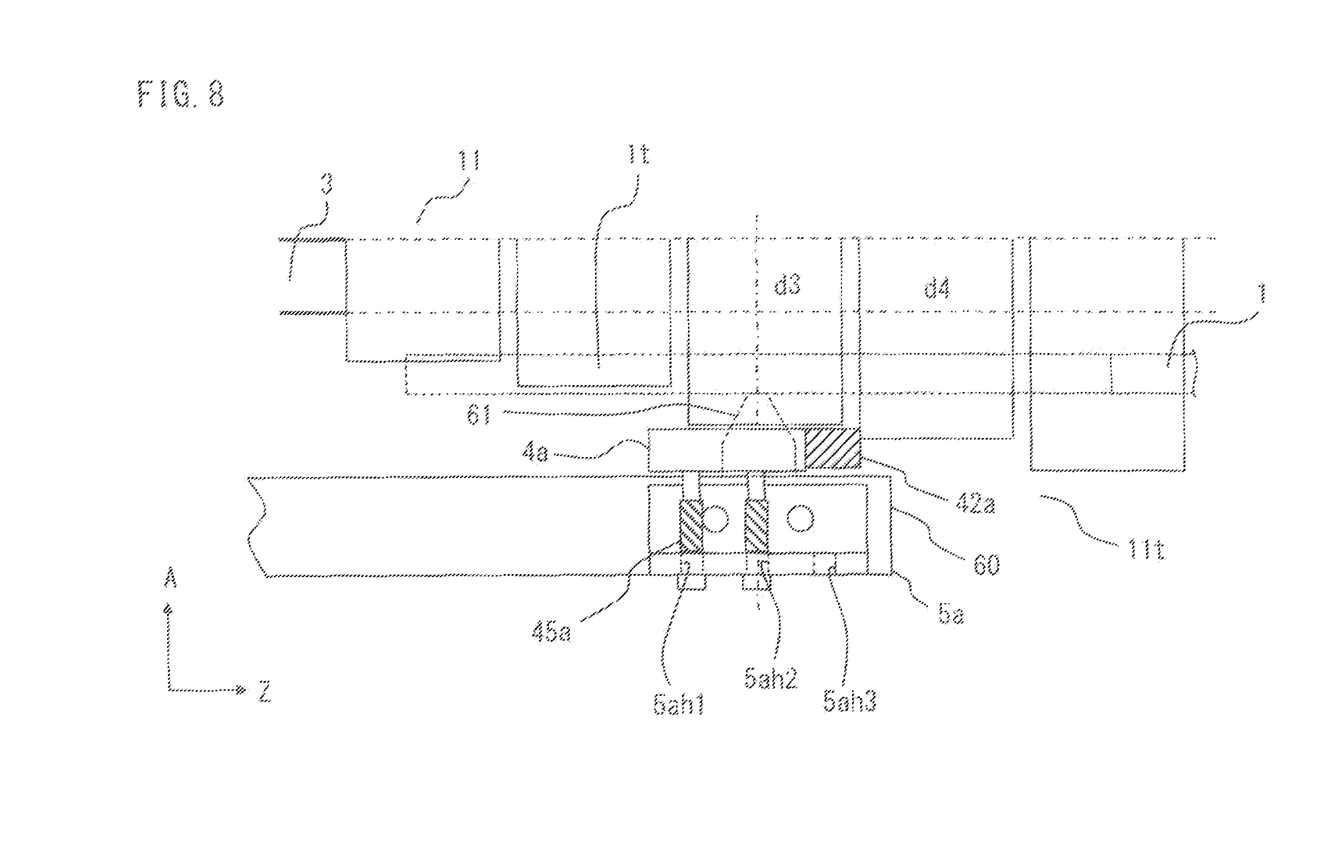
FIG. 8 shows variation of the end wedge which is an inspection target.

FIG. 6 to FIG. 8 show variations of the end wedge it which is an inspection target by the device 100. Hereinafter, with reference to FIG. 6 to FIG. 8, a method for attaching the first attraction portion 4a to the stepped-down portion 11t of the stator core 11 will be described. It is noted that a method for attaching the second attraction portion 4b to the stepped-down portion 11t of the stator core 11 is the same as that for the first attraction portion 4a, and therefore the description thereof is omitted. Attachment of the second attraction portion 4b is performed simultaneously with attachment of the first attraction portion 4a.

In the respective drawings, the positions where the end wedge 1t is inserted are different, and therefore the positions where the first attraction portion 4a is attracted are also different. Specifically, FIG. 6 and FIG. 7 show cases where the position in the axial direction Z of the end wedge 1t is different, for comparison, and FIG. 8 shows the stator in which the position in the radial direction A of the end wedge it is changed from FIG. 6.

In the example shown in FIG. 6, the center position in the axial direction Z on the end wedge 1t (i.e., a tapping position of the tap hammer 61) is the center position in the axial direction Z on a third step d3 of the stepped-down portion 11t. Therefore, the first attraction portion 4a is attached to the first connection member 5a using two attachment holes 5ah1, 5ah2 on the outer side in the axial direction Z among the three attachment holes, so as not to interfere with a fourth step d4 of the stepped-down portion 11t. The first attraction portion 4a is positioned such that the inner side end surface in the axial direction Z of the attachment 42a for adjusting the position in the axial direction Z is pressed against the outer side end surface in the axial direction Z of the fourth step d4 of the stepped-down portion 11t. Thus, positioning can be made also for the position at which the end wedge 1t is struck by the tap hammer 61.

In the example shown in FIG. 7, the center position in the axial direction Z on the end wedge it is a position between the third step d3 and the fourth step d4 of the stepped-down portion 11t. If the first attraction portion 4a is attempted to be attached to the third step of the stepped-down portion 11t in the same manner as in FIG. 6, the first attraction portion 4a interferes with a fifth step d5 of the stepped-down portion 11t. Therefore, the first attraction portion 4a is attached to the first connection member 5a using two attachment holes 5ah2, 5ah3 on the inner side in the axial direction Z. The first attraction portion 4a is positioned such that the inner side end surface in the axial direction Z of the attachment 42a for adjusting the position in the axial direction Z is pressed against the outer side end surface in the axial direction Z of the fifth step d5 of the stepped-down portion 11t. Thus, positioning can be made also for the position at which the end wedge 1t is struck by the tap hammer 61. The axial-direction length of the attachment 42a for adjusting the position in the axial direction Z is slightly greater than that in FIG. 6.

At this time, the reason why the two attachment holes 5ah2, 5ah3 on the inner side in the axial direction Z are used to attach the first attraction portion 4a to the first connection member 5a is to increase the contact area between the permanent magnet P and the stepped-down portion 11t and ensure the attraction force.

In the example shown in FIG. 8, as compared to the example shown in FIG. 6, the position of the end wedge 1t is shifted to the inner side in the radial direction A of the rotary electric machine, and in this state, the tap hammer 61 comes close and interferes therewith. Therefore, the attachments 45a for adjusting the position in the radial direction A are replaced with the ones having a greater thickness, so as to let the inspection unit 60 recede to the inner side.

In this way, in order to perform accurate positioning for the position in the axial direction Z where the first attraction portion 4a is attracted so that the tap hammer 61 is set at the center position in the axial direction Z on the end wedge it which is an inspection target, attachment holes to be used among the plurality of attachment holes 5ah1 to 5ah3 arranged in the axial direction Z in the first connection member 5a, and the kinds of the attachment 42a and the attachments 45a, are determined.

Figure 9:
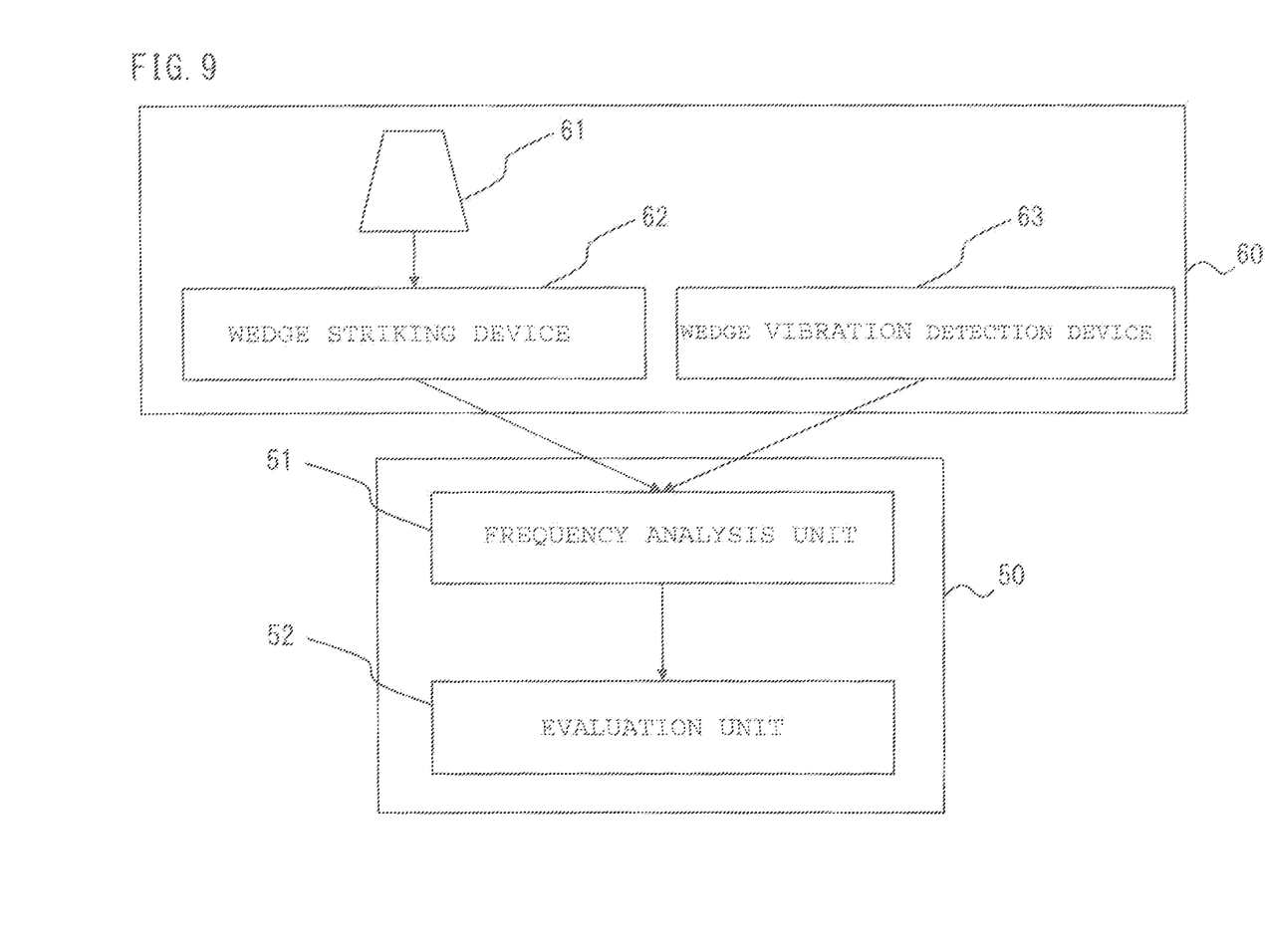
FIG. 9 is a block diagram showing the configuration of an end wedge looseness determination system for a rotary electric machine according to embodiment 1.

FIG. 9 is a block diagram showing the configuration of an end wedge looseness determination system for the rotary electric machine. The wedge looseness inspection system for the rotary electric machine is composed of the inspection unit 60 and a wedge looseness analysis determination unit 50.

The inspection unit 60 includes a wedge striking device 62 having the tap hammer 61 for striking the end wedge 1*t*, and a wedge vibration detection device 63 for detecting vibration of the end wedge 1*t* due to the striking.

The wedge looseness analysis determination unit 50 includes a frequency analysis unit 51 for analyzing a frequency characteristic of a vibration waveform of the struck end wedge it, and an evaluation unit 52 which, after aggregating frequency characteristics analyzed from the vibration waveform, performs comparison and evaluation thereof with a predetermined determination reference, and quantifies a determination result thereof.

First, the inspection unit 60 strikes the end wedge it by the tap hammer 61, and sends wedge vibration information detected by the wedge vibration detection device 63, to the wedge looseness analysis determination unit 50. The wedge vibration information is a wedge vibration waveform measured by the wedge vibration detection device 63. Next, the frequency analysis unit 51 receives the wedge vibration information, analyzes a frequency component of the wedge vibration waveform, and obtains a frequency characteristic of the wedge vibration.

From the frequency characteristic of the wedge vibration obtained by the frequency analysis unit 51 regarding the vibration waveform, the evaluation unit 52 performs comparison and evaluation between the predetermined determination reference and the frequency of a peak that appears, to determine whether or not there is looseness of the end wedge 1*t*.

A device for detecting and measuring vibration of the end wedge 1*t* may be any device such as a contact-type vibration sensor or an acceleration sensor that can detect vibration, and may be a sound-collecting microphone, a displacement sensor, or the like.

The wedge looseness inspection device for a rotary electric machine according to embodiment 1 is a wedge looseness inspection device for a rotary electric machine in which, at an end in an axial direction of a stator core, a part having such a stepped shape that an inner diameter of the stator core increases stepwise toward an outer side in the axial direction is defined as a stepped-down portion, the wedge looseness inspection device being for inspecting looseness of a wedge pressing an inner circumferential surface of a conductor inserted into a slot of the stepped-down portion, toward an outer side in a radial direction so as to be fixed, the wedge looseness inspection device including:
   an inspection unit including a wedge striking device having a tap hammer for striking the wedge, and a wedge vibration detection device for detecting vibration of the wedge due to the striking; and
   an attraction portion connected to the inspection unit via a connection member and being attractable to an inner circumferential surface of the stepped-down portion, wherein
   the attraction portion has, on an inner side in the axial direction, a first attachment that allows adjustment of an attached position in the axial direction of the attraction portion.

Thus, since the first attachment allows adjustment of the position in the axial direction and can be replaced with another one having a different thickness, the wedge looseness inspection device can be applied to various rotary electric machines irrespective of the length in the axial direction Z of the end wedge which differs among the types of the rotary electric machines, or difference in the relative positional relationship between the end wedge and the stepped-down portion.

In addition, a driving mechanism such as a motor, a pulley, and a gear needed for movement and a control mechanism relevant thereto, become unnecessary, and also a visual confirmation camera needed for determining the striking position, and sensors such as a distance meter, become unnecessary. Thus, the number of components can be decreased, and the wedge looseness inspection device having high accuracy can be provided at low cost.

In addition, in the wedge looseness inspection device for the rotary electric machine according to embodiment 1, a second attachment that allows adjustment of a position in the radial direction of the inspection unit is further provided between the attraction portion and the connection member.

Thus, the first attraction portion and the second attraction portion allow the position in the radial direction A of the inspection unit to be adjusted in a predetermined length range. By replacing the attachment with another one having a different thickness in accordance with the step elevation in the radial direction of the stepped-down portion at which the first attraction portion and the second attraction portion are attracted, the wedge looseness inspection device can be applied to various types of rotary electric machines.

In addition, in the wedge looseness inspection device for the rotary electric machine according to embodiment 1, the connection member has a plurality of attachment holes which are arranged in the axial direction and allow a connection position of the attraction portion to be changed in the axial direction.

Thus, it becomes possible to change the connection positions of the first attraction portion and the second attraction portion in the axial direction Z also through selection of the attachment holes, whereby the first attraction portion and the second attraction portion can be prevented from interfering with the steps.

In addition, the wedge looseness inspection system for a rotary electric machine according to embodiment 1 includes:
   the wedge looseness inspection device for the rotary electric machine according to any one of the above configurations;
   a frequency analysis unit for analyzing a frequency characteristic of a vibration waveform of the struck wedge; and
   an evaluation unit which compares and evaluates the frequency characteristic analyzed from the vibration waveform, with a predetermined determination reference, and quantifies a determination result thereof.

Thus, it is possible to appropriately determine the state of the end wedge which differs among the types of the rotary electric machines.

In addition, the wedge looseness inspection method for a rotary electric machine according to embodiment 1 uses the wedge looseness inspection device for the rotary electric machine according to any one of the above configurations, and includes:
   without taking off a rotor from the rotary electric machine, inserting the wedge looseness inspection device for the rotary electric machine between the stepped-down portion and the rotor of the rotary electric machine from the outer side in the axial direction; and
   pressing an inner side end surface in the axial direction of the first attachment against an outer side end surface in the axial direction of the stepped-down portion having the stepped shape, so as to make positioning for a position at which the wedge is struck by the tap hammer.

Thus, it is possible to inspect looseness of the wedge fixing the coil of the stator, without taking off the rotor, whereby the inspection work can be finished within a short time.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 100 wedge looseness inspection device
1 wedge
1*t* end wedge
10 stator
11 stator core
11*t* stepped-down portion
20 rotor
3 conductor
4*a* first attraction portion
4*b* second attraction portion
41*a* attraction surface
42*a* attachment
43*a* adjustment member
44*a* fastening member
45*a* attachment
5*a* first connection member
5*b* second connection member
5*ah*1, 5*ah*2, 5*ah*3 attachment hole
50 wedge looseness analysis determination unit
51 frequency analysis unit
52 evaluation unit
51*a* fastening member
60 inspection unit
61 tap hammer
62 wedge striking device
63 wedge vibration detection device
9 handle
A radial direction
B circumferential direction
Z axial direction
P permanent magnet

The invention claimed is:

1. A wedge looseness inspector for a rotary electric machine in which, at an end in an axial direction of a stator core, a part having such a stepped shape that an inner diameter of the stator core increases stepwise toward an outer side in the axial direction is defined as a stepped-down portion, the wedge looseness inspector being for inspecting looseness of a wedge pressing an inner circumferential surface of a conductor inserted into a slot of the stepped-down portion, toward an outer side in a radial direction so as to be fixed, the wedge looseness inspector comprising:

an inspector including a wedge striker having a tap hammer for striking the wedge, and a wedge vibration detector for detecting vibration of the wedge due to the striking; and an attraction portion connected to the inspector via a connection member and being attractable to an inner circumferential surface of the stepped-down portion, the attraction portion having, on an inner side in the axial direction, a first attachment with an inner side end surface, a position of the inner side end surface being adjustable in the axial direction relative to the inspector, wherein the first attachment is configured to determine an attached position in the axial direction of the attraction portion by pressing the inner side end surface in the axial direction against an outer side end surface in the axial direction of the step in the stepped-down direction and to adjust the attached position by adjustment of the position of the inner side end surface relative to the inspector.

2. The wedge looseness inspector for the rotary electric machine according to claim 1, wherein
a second attachment that allows adjustment of a position in the radial direction of the inspector is provided between the attraction portion and the connection member.

3. The wedge looseness inspector for the rotary electric machine according to claim 2, wherein
the connection member has a plurality of attachment holes which are arranged in the axial direction and allow a connection position of the attraction portion to be changed in the axial direction.

4. A wedge looseness inspection system for a rotary electric machine, comprising:
the wedge looseness inspector for the rotary electric machine according to claim 3;
a frequency analyzer for analyzing a frequency characteristic of a vibration waveform of the struck wedge; and
an evaluator which compares and evaluates the frequency characteristic analyzed from the vibration waveform, with a predetermined determination reference, and quantifies a determination result thereof.

5. A wedge looseness inspection method for a rotary electric machine, using the wedge looseness inspector for the rotary electric machine according to claim 3, the wedge looseness inspection method comprising:
without taking off a rotor from the rotary electric machine, inserting the wedge looseness inspector for the rotary electric machine between the stepped-down portion and the rotor of the rotary electric machine from the outer side in the axial direction; and
pressing an inner side end surface in the axial direction of the first attachment against an outer side end surface in the axial direction of the stepped-down portion having the stepped shape, so as to make positioning for a position at which the wedge is struck by the tap hammer.

6. A wedge looseness inspection system for a rotary electric machine, comprising:
the wedge looseness inspector for the rotary electric machine according to claim 2;
a frequency analyzer for analyzing a frequency characteristic of a vibration waveform of the struck wedge; and
an evaluator which compares and evaluates the frequency characteristic analyzed from the vibration waveform, with a predetermined determination reference, and quantifies a determination result thereof.

7. A wedge looseness inspection method for a rotary electric machine, using the wedge looseness inspector for the rotary electric machine according to claim 2, the wedge looseness inspection method comprising:
without taking off a rotor from the rotary electric machine, inserting the wedge looseness inspector for the rotary electric machine between the stepped-down portion and the rotor of the rotary electric machine from the outer side in the axial direction; and
pressing an inner side end surface in the axial direction of the first attachment against an outer side end surface in the axial direction of the stepped-down portion having the stepped shape, so as to make positioning for a position at which the wedge is struck by the tap hammer.

8. The wedge looseness inspector for the rotary electric machine according to claim 1, wherein
the connection member has a plurality of attachment holes which are arranged in the axial direction and allow a connection position of the attraction portion to be changed in the axial direction.

9. A wedge looseness inspection system for a rotary electric machine, comprising:
the wedge looseness inspector for the rotary electric machine according to claim 8;
a frequency analyzer for analyzing a frequency characteristic of a vibration waveform of the struck wedge; and
an evaluator which compares and evaluates the frequency characteristic analyzed from the vibration waveform, with a predetermined determination reference, and quantifies a determination result thereof.

10. A wedge looseness inspection method for a rotary electric machine, using the wedge looseness inspector for the rotary electric machine according to claim 8, the wedge looseness inspection method comprising:
without taking off a rotor from the rotary electric machine, inserting the wedge looseness inspector for the rotary electric machine between the stepped-down portion and the rotor of the rotary electric machine from the outer side in the axial direction; and
pressing an inner side end surface in the axial direction of the first attachment against an outer side end surface in the axial direction of the stepped-down portion having the stepped shape, so as to make positioning for a position at which the wedge is struck by the tap hammer.

11. A wedge looseness inspection system for a rotary electric machine, comprising:
the wedge looseness inspector for the rotary electric machine according to claim 1;
a frequency analyzer for analyzing a frequency characteristic of a vibration waveform of the struck wedge; and
an evaluator which compares and evaluates the frequency characteristic analyzed from the vibration waveform, with a predetermined determination reference, and quantifies a determination result thereof.

12. A wedge looseness inspection method for a rotary electric machine, using the wedge looseness inspector for the rotary electric machine according to claim 1, the wedge looseness inspection method comprising:
without taking off a rotor from the rotary electric machine, inserting the wedge looseness inspector for the rotary electric machine between the stepped-down portion and the rotor of the rotary electric machine from the outer side in the axial direction; and
pressing an inner side end surface in the axial direction of the first attachment against an outer side end surface in the axial direction of the stepped-down portion having the stepped shape, so as to make positioning for a position at which the wedge is struck by the tap hammer.

* * * * *